(12) United States Patent
Perret et al.

(10) Patent No.: US 9,065,578 B2
(45) Date of Patent: Jun. 23, 2015

(54) AUDIO WATERMARK DETECTION FOR DELIVERING CONTEXTUAL CONTENT TO A USER

(71) Applicant: Distribeo, Paris (FR)

(72) Inventors: Jean Perret, Paris (FR); Alban Gruget, Paris (FR)

(73) Assignee: DISTRIBEO, Paris (FR)

( * ) Notice: Subject to any disclaimer, the term of this patent is extended or adjusted under 35 U.S.C. 154(b) by 267 days.

(21) Appl. No.: 13/720,070

(22) Filed: Dec. 19, 2012

(65) Prior Publication Data

US 2013/0171926 A1    Jul. 4, 2013

(30) Foreign Application Priority Data

Dec. 29, 2011    (EP) .................................... 11306812

(51) Int. Cl.
*H04H 20/71*      (2008.01)
*H04H 60/46*      (2008.01)
*H04H 60/00*      (2009.01)
*G10L 19/018*     (2013.01)
*H04L 29/08*      (2006.01)

(52) U.S. Cl.
CPC .............. *H04H 60/46* (2013.01); *H04H 60/00* (2013.01); *G10L 19/018* (2013.01); *H04L 67/30* (2013.01)

(58) Field of Classification Search
CPC ........ H04H 60/00; H04H 60/46; H04L 67/30; G10L 19/18
USPC .................................. 455/3.01–3.06; 700/94
See application file for complete search history.

(56) References Cited

U.S. PATENT DOCUMENTS

2010/0114344 A1    5/2010  Hannaby

OTHER PUBLICATIONS

Miller et al., "Computing the Probability of False Watermark Detection",2000, LNCS vol. 1768, pp. 146-158.*
European Search Report dated Jun. 12, 2012 in European Patent Application No. 11306812.6 filed Dec. 29, 2011.

* cited by examiner

*Primary Examiner* — Raymond Dean
(74) *Attorney, Agent, or Firm* — Knobbe, Martens, Olson, and Bear, LLP

(57) ABSTRACT

A system and method for delivering content to at least one mobile communication device is disclosed. The system comprises software for detecting an audio watermark in a watermarked audio signal that has been broadcast by at least one local audio transmitter and if necessary triggering an event on the mobile communication device.

15 Claims, 7 Drawing Sheets

AUDIO WATERMARK DETECTION FOR DELIVERING CONTEXTUAL CONTENT TO A USER

CROSS-REFERENCE TO RELATED APPLICATIONS

This application claims the benefit under 35 U.S.C. §119 (a)-(d) of European Patent Application No. EP11306812.6, filed on Dec. 29, 2011 and entitled "Audio Watermark Detection for Delivering Contextual Content to a User", and is incorporated herein by reference in its entirety.

BACKGROUND

1. Field of the Technology

The technology relates to the field of the delivery of content to a mobile communication device taking into account the context of use and the interests of the user of the mobile communication device.

2. Description of the Related Technology

With the new development in the field of communication, more and more users are now equipped with a mobile communication device such as a smartphone and the like.

Thus, mobile communication devices such as smartphones, now provide a platform for delivering, to a user, various contents and in particular for promoting sales by sending advertisements, coupons, rewards, etc. For example, a company may send an advertisement to a consumer via an email or a short message (text message).

However, these recent applications disturb the user for a result which may not be relevant to him.

SUMMARY OF CERTAIN INVENTIVE ASPECTS

Certain inventive aspects relate to a method and a system for waking up automatically a mobile communication device by the detection of a watermark in an audio signal, the audio watermark permitting to trigger the delivering of a content to a user, the content being relevant to him, or to prepare this delivering for a next watermark detection.

Watermarking a numerical audio file to insert information relevant to the user or used to authenticate a file is already in use. But in general, the watermarking is performed to encode a digitized audio file, and it does not work when the audio file is played over speakers and received with a microphone.

In the known solutions, a message is encoded in an audio signal in a form of a watermark, the audio signal being sent to the mobile communication device of a user, this message permitting to deliver content to a user.

To this end, the mobile communication device acquires the audio signal and decodes it for retrieving the watermark and for retrieving the useful content.

However, these solutions are complex to implement; they require the acquisition of the audio signal during a long period of time and require a permanent connection between the mobile communication device and a server for accessing a database for retrieving the useful content.

Certain inventive aspects do not have the drawbacks of the known solutions and proposes. According to a first aspect, there is a method for delivering content to at least one mobile communication device comprising software for detecting audio watermark in a watermarked audio signal broadcasted by at least one local machine and if necessary triggering an event on the mobile communication device, the method comprising the following:

- the mobile communication device determines, periodically, a user local profile, the local profile comprising a localization of the mobile communication device;
- the mobile communication device sends periodically, to a remote server, a request for parameters of at least one audio watermark i, the parameters comprising N frequency bands $F_{ik}$, k=0, . . . , N−1, a likelihood function $L_i$ to be computed, a likelihood threshold $T_i$ and at least one event to be triggered on the mobile communication device corresponding to the audio watermark along with the user local profile;
- the remote server transmits back, if necessary, to the mobile communication device the parameters, the parameters being selected by the remote server in view of the user local profile so that the event is relevant for the user;
- the mobile communication device, comprising a memory, stores in the memory the parameters;
- the mobile communication device polls its environment for acquiring an audio signal and processes the audio signal in:
  - determining the power spectral density of the audio signal for each of the frequency bands;
  - computing the likelihood function corresponding to each watermark to be studied;
  - if the result of the likelihood function exceeds the likelihood threshold, triggers the corresponding event on the mobile communication device.

In various embodiments, the method according to the first aspect may have one or more of the following features:

- the parameters of the watermark i further comprise power spectral densities $P_{ik}$ for each of frequency band $F_{ik}$ of the broadcasted watermarked audio signal, and wherein the likelihood function $L_i$ for a watermark i is based on the computation of a mathematical distance between the normalized vector of the power spectral densities computed from the acquired signal and the vector of the power spectral densities sent to the mobile communication device along with the other parameters of the watermark I;
- the parameters of the watermark i further comprise power spectral densities $P_{ik}$ for each of frequency band $F_{ik}$ of the broadcasted watermarked audio signal, and wherein the likelihood function $L_i$ for a watermark i being based on calculating the ratios between at least two power spectral densities of the acquired signal;
- the remote server compares the previous transmitted parameters with the ones that the remote server is ready to transmit back to the mobile communication device and only transmits back to the mobile communication device if they are different;
- the polling comprises an acquisition time and a wait time, the ratio between the busy acquisition time and wait time being greater than 10.
- the mobile communication device acquires the audio signal every 2 to 10 seconds, preferably every 5 seconds;
- the mobile communication device acquires the audio signal during 50 to 300 ms, preferably during 150 ms;
- the watermark of the audio signal is a pattern made in a frequency band of an initial audio signal by modifying the amplitude of an initial audio signal in this frequency band, the parameters for the detection being relevant frequency bands describing the variations of the pattern and threshold for identifying the variations;
- the pattern is made by attenuating at least one frequency of the initial audio signal in the frequency band;

the pattern is obtained by amplifying the audio signal in at least one frequency band of the initial audio signal;

the local machine comprises a module for generating the watermarked audio signal from an initial audio signal and then broadcasts the watermarked audio signal;

the server, determines a user remote profile, the user remote profile comprising at least: interest of the user, gender of the user, and in addition to the user local profile, the server selects the parameters and the event depending on this remote profile;

the mobile communication device sends the user local profile to the remote server periodically, and preferably every ten minutes.

Another aspect is a system for delivering content to a mobile communication device comprising software for detecting audio watermark in a watermarked audio signal broadcasted by a local machine and if necessary triggering an event on the mobile communication device, the system being adapted for delivering content according to a method according to the first aspect of the invention.

Certain advantages may be attributed to various aspects and embodiments as follows:

The detection of the watermark does not require to be connected to the server. The detection is instantaneous and does not require any action from the user of the mobile communication device. The instantaneous detection (about 200 ms) guarantees that the process can't be diverted to spy conversations and thus privacy is respected. Also the mobile communication device may operate in polling mode. By "polling", we mean activating periodically and during a short time period a checking process to sense if a watermarked signal is present (i.e., to acquire an audio signal for detecting whether it contains an audio watermark). Therefore, the power consumption of the mobile communication device is low. The device retrieves only some parameters, especially related to the general and immediate context, for the watermark detection. Therefore the size of the data in the mobile communication device is small. Also the use of a simple likelihood function enables low-power polling behavior. The information is implemented in the watermarked audio signal such as it is not audible by the user. The user is not disturbed by the encoding of the content. Furthermore, the user only receives content which is relevant to him since it depends on his profile. As a result the content corresponds to the interests of the user and is delivered when he is available to receive it. Furthermore the delivering instant can be chosen accordingly to the content and the media. For example a watermark detection can trigger the delivering of the content at the end of the audio file, or at a later action from the user.

BRIEF DESCRIPTION OF THE DRAWINGS

Other features and advantages of the invention will appear in the following description. Embodiments of the invention will be described with reference to the drawings, in which.

DETAILED DESCRIPTION OF CERTAIN INVENTIVE EMBODIMENTS

System for Delivering Content

Figure 1:
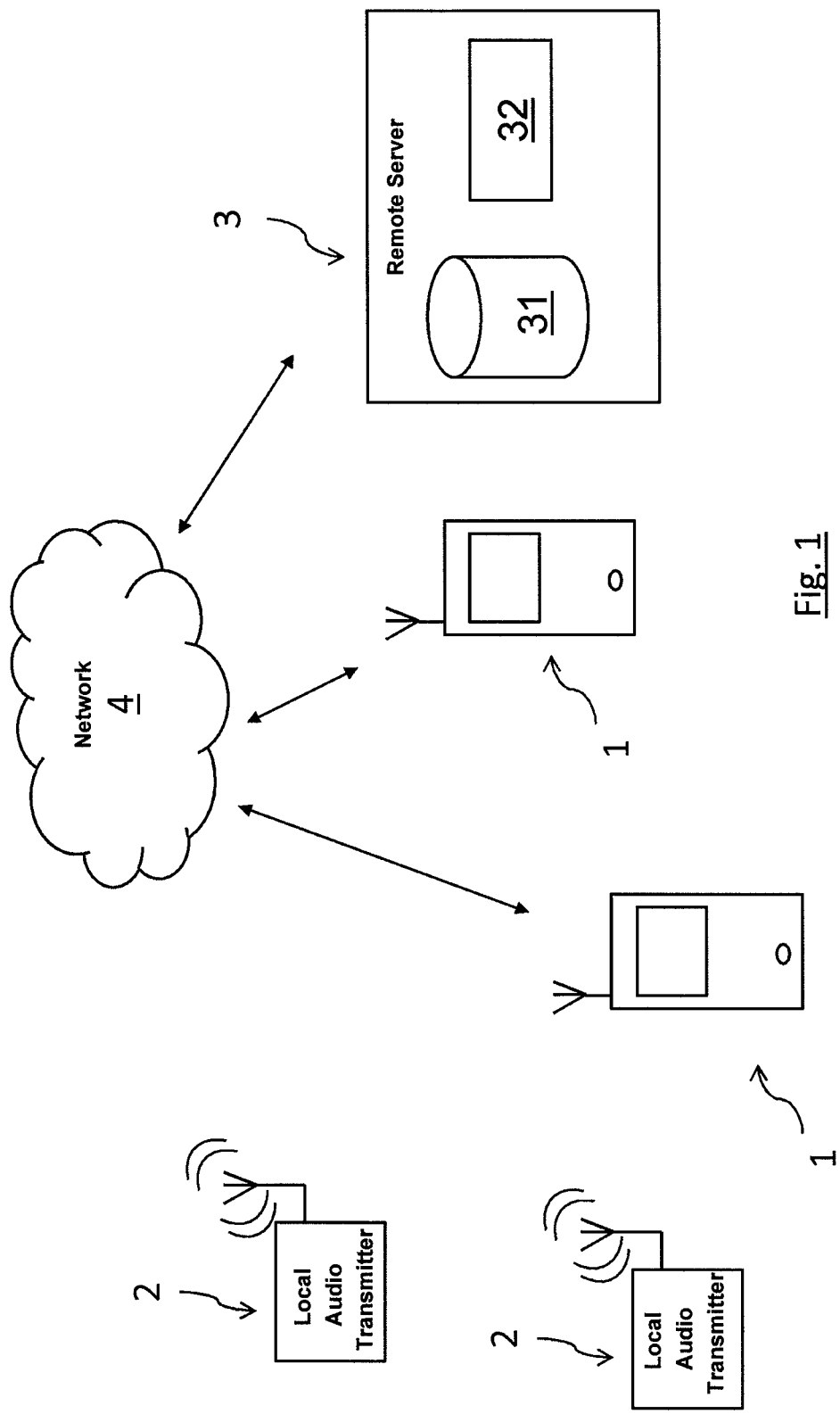
FIG. 1 illustrates a system for delivering content according to an embodiment of the invention.

Referring to FIG. 1 a system and computing environment for delivering content according to an embodiment of the invention comprises: at least one mobile communication device 1, at least one local machine 2, a remote server 3, and a network 4.

The mobile communication device 1 comprises an interface (not shown) for communicating with the remote server 3 through the network 4. It also comprises a user interface (not shown) for interaction between the mobile communication device 1 and the user if needed, a screen (not shown), a microphone (not shown), a memory (not shown) and a processor (not shown).

The local machine 2 comprises an audio transmitter for broadcasting, over the air, a watermarked audio signal. The local machine 2 may be a box placed in a store and only dedicated to broadcasting watermarked audio signal, a television, a vending machine or more generally any type of device comprising an audio transmitter for broadcasting audio signal.

The remote server 3 comprises a database 31 wherein various data relating to content are stored, a processor 32 for processing, if necessary, the received signals and requests. These data are in particular parameters for watermark detection and events corresponding to the watermarks (see below).

By "event" we mean an action triggered on the mobile communication device 1 such as a display for delivering an information to the user, the information may be a reward that can be offered to a user (for instance a customer) such as a price reduction relating to a product that is in a store wherein the local machine is placed or to a product that is distributed by a vending machine. The reward may also not be directly delivered by the local machine 2. In particular, a remote server 3 may deliver a link for downloading a file (corresponding for instance to music, game, video, etc.) on the memory of the mobile communication device. The event may also be triggered by a commercial advertisement broadcasted on TV or radio or on a web banner. The event can contain a delay instruction to trigger the delivering of the content at a specified instant. This delay can be set accordingly to the content or the media. For example the specified instant may be 2 seconds after the end of the watermarked audio file, or when the user localizes to a specified area.

The network 4 may be a wireless network such as a WiFi network, a WiMax network, a cellular network (3G or GSM network). The network 4 may also be bridged to the Internet network for reaching the back office server 3.

Method for Delivering Content

A user has a mobile communication device 1 with software for receiving content and in particular for detecting audio watermark in a watermarked audio signal broadcasted by the local machine 2.

In particular, the software is dedicated to acquiring an audio signal, to detecting whether the acquired signal comprises an audio watermark and if necessary to triggering an event on the mobile communication device 1 and to managing the event.

The software may be launched either manually by a user or automatically, and may be running on the mobile communication device 1 as a foreground or background task.

Figure 2:
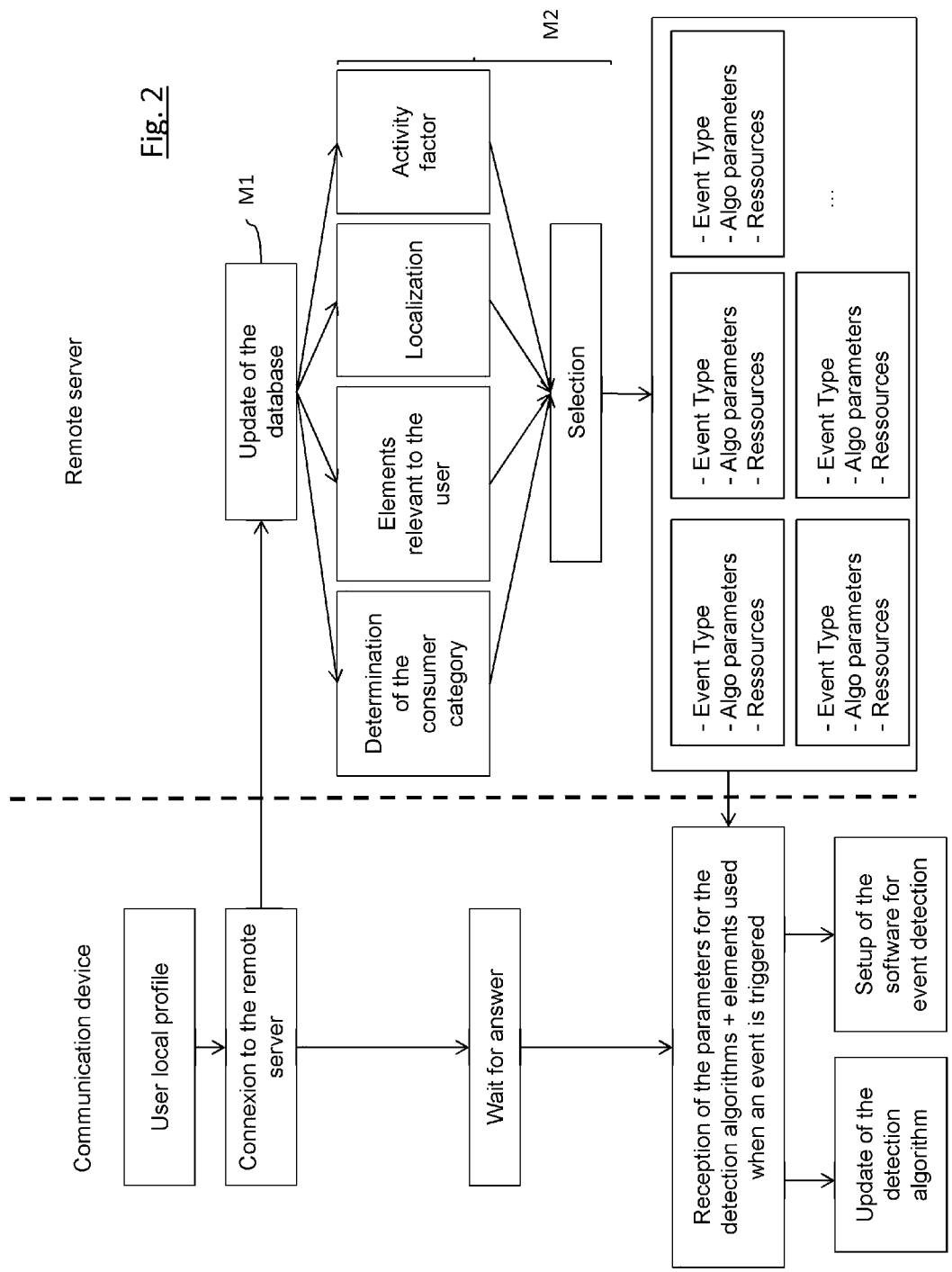
FIG. 2 illustrates steps implemented in a method for delivering content according to an embodiment of the invention.

A method according to an embodiment of the invention in relation to FIG. 2 is now described. The method of the invention permits to deliver content to a mobile communication device 1 depending on the profile of the user when a known watermarked audio is broadcasted by a local machine 2. The mobile communication device 1 sends periodically a request, to the remote server 3, for parameters of at least one audio watermark i. Each watermark corresponds to a set of parameters. Each parameter is sent if not already present in the mobile communication device. Those parameters comprise at least frequency bands $F_{ik}$ k=0, . . . N−1, a likelihood function $L_i$, a likelihood threshold $T_i$ and at least one event $E_i$ to be triggered on the mobile communication device 1. A time period may also be sent. This period corresponds to the maximum polling period acceptable to allow a correct detection of the audio watermark in the acquired audio signal. The mobile communication device 1 will then set its polling period as the minimum period over all the watermark parameters received.

The parameters depend on the context (immediate or general). The immediate context is described with a user local profile comprising: localization and/or time and/or activity factor and/or user preferences changes. The general context is described with a user remote profile which is stored in the memory of the remote server 3, the user remote profile comprising: gender and/or age and/or home address and other elements related to the user. It also comprises technical information's about his mobile communication device 1.

The remote profile may also include elements independent of the user. For instance, advertisements sponsored from some friends (a friend may recommend to him a specific event), events previously detected (if an event is supposed to be triggered only once a day, it is useless to send it again). Therefore, in order to take into account the user profile, the system and the method of the invention are based on the user local profile and, if available, the user remote profile.

The localization may be determined using an embedded GPS on the mobile communication device 1. The localization is the most relevant parameter describing the user local profile. This localization is based on the values determined by the mobile communication device 1. The localization method also is sent. By instance, an absence of GPS localization may indicate that the user is in a building. Moreover, if the last found detection is around the known location of his house, it may indicate that the user is at home.

The user preferences may be set/modified by the user or inferred from his actions, for instance from the previous events detected. The activity factor may be deduced from values of an embedded accelerometer. A low value indicates that the mobile communication device 1 stays static; a high value indicates that the mobile communication device 1 is moving. Additionally, the activity factor along with the localization may be used to state that the user is arriving close to a shop equipped with a local machine 2. Then, the method comprises a step wherein the mobile communication device 1 determines, periodically, a user local profile, the local profile comprising at least the localization of the mobile communication device 1. Therefore, along the request for parameters, the mobile communication device 1 sends the user local profile to the remote server 3. When major changes for various data sent by the user are observed, the remote server 3 may update its database 31 with the new data (information relating to the user). Depending on the user local profile and, if available, the user remote profile, the remote server 3 processes all the information for selecting in its database 31 the parameters of at least one watermark: for event to be triggered on the mobile communication device 1 and for watermark detection.

The remote server database 31 is also used to register the type of the mobile communication device 1 targeted by the system. This parameter is used to send the watermark parameters related to this specific type of mobile communication device 1. This step is important since the optimized parameters may depend on the target mobile communication device 1 (for instance characteristics of the microphone of the mobile communication device 1).

The remote server 3 processes the information in two distinct phases: an update M1 of the database 31 of the remote server 3 and the selection M2 of parameters. The phase M1 is activated for every category of user every time the database 31 is updated. Then the remote server 3 is able to associate to each user a list of all the events that may be relevant to the user. This phase M1 depends on the user remote profile. The phase M2 is activated every time the user local profile is sent to the remote server 3 by the mobile communication device 1. During this phase M2, the remote server 3 determines the user category (based on the user remote profile), determines, if necessary, elements independent from the user category (based on the user remote profile), the localization (based on the user local profile) and the activity factor (based on the user local profile). Based on the result of phase M2, the remote server 3 selects in its database 31 parameters for at least one watermark. The parameters are sent in accordance with the target mobile communication device 1 (brand and model) since the parameters and especially the thresholds may differ from a type of device from another (microphone quality, normalized power, codec's, etc.) One can note that the event includes all the resources used by the mobile communication device 1 to accomplish the event (images, sounds, videos, web links, local URI, URLs, etc.). Once the remote server 3 has selected these data, it transmits them to the mobile communication device 1. For instance, if the mobile communication device 1 is identified to be close to a shop equipped with a local machine 2, the parameters will be sent accordingly. Or if the user is likely to be at home, the parameters will be selected to trigger an action when watching a certain commercial on TV.

One can note that the remote server 3 may compare the previous transmitted data with the ones that the remote server 3 is ready to transmit to the mobile communication device 1 and only transmits them to the mobile communication device 1 if they are different.

After the mobile communication device 1 has received the data, the mobile communication device 1 stores in its memory the received data i.e., the parameters of audio watermark(s), including the event(s) data. Then the detection algorithm is modified taking into account those new parameters. The mobile communication device 1 also acquires periodically an audio signal. In a preferred manner, the mobile communication device 1 acquires the audio signal every 3 to 10 seconds, preferably every 5 seconds. Furthermore, in a preferred manner the audio signal is acquired during 50 to 300 ms, preferably during 150 ms. The mobile communication device 1 operates in a polling mode: in a preferred manner, the ratio between wait time and busy acquisition time is greater than 10.

Figure 3:
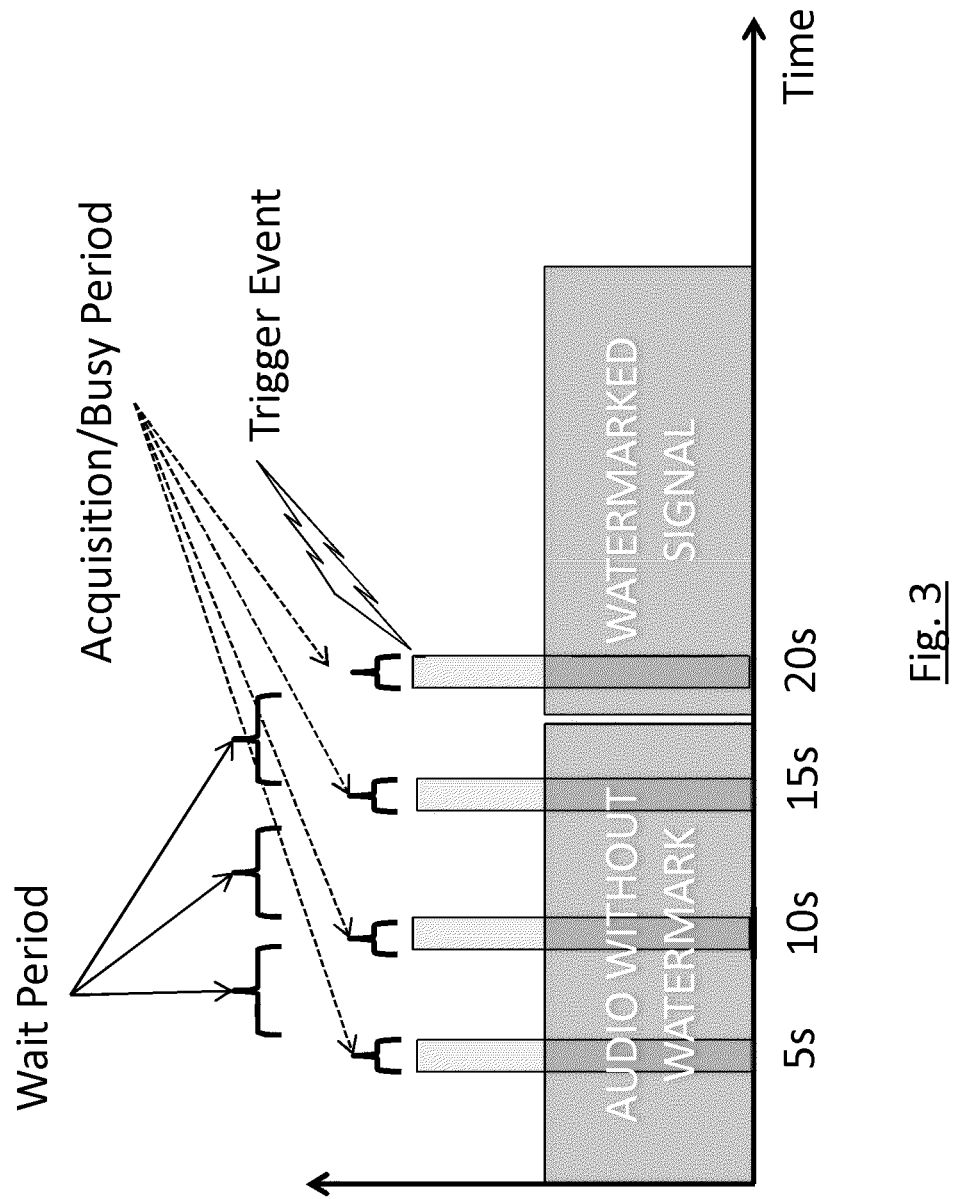
FIG. 3 illustrates the polling mode implemented in a method embodiment of the invention.

FIG. 3 illustrates the polling mode of the mobile communication device 1. The software regularly activates the detection and processes the recorded audio signal. If an audio signal watermarked is broadcasted during the acquisition time, an event may be triggered. One can note that the acquisition time is lower than the wait time. One can also note that the polling period has to be less than the duration of the watermarked signal to be sure to achieve detection. To cope with this potential issue, the maximum polling period may be sent along with the other watermark parameters.

For acquiring the audio signal, the mobile communication device 1 switches on its microphone. Since the duration of the acquisition is very short, the power consumption needed for the acquisition is very low. As a consequence, the duration is long enough to extract some frequency characteristics, but not long enough to record part of a conversation by instance (much less than a second). This prevents the system to be used to spy private elements. Once the audio signal is acquired, the mobile communication device 1 detects whether the acquired audio signal contains a watermark corresponding to the received parameters. And if the mobile communication device 1 detects an audio watermark in view of the received parameters, the mobile communication device 1 triggers the corresponding event on the mobile communication device 1.

Method for Generating/Detecting the Audio Watermarks

Audio watermarking is a process for embedding additional information in audio signal. The audio signal is slightly modified in a defined manner. This modification is such that the human ear cannot perceive an acoustic difference. In certain embodiments, the additional information embedded in the audio signal permits to trigger an event on the mobile communication device 1. For watermarking an initial audio signal, two modes are considered: the first one is to remove parts (by cutting or attenuating frequency bands) of an initial audio signal in some intermediate chosen frequencies (for instance audio signal in frequency band between 4 to 10 kHz), the second is to amplify an initial audio, preferably in the highest frequencies acceptable for the audio path considered.

Figure 4:
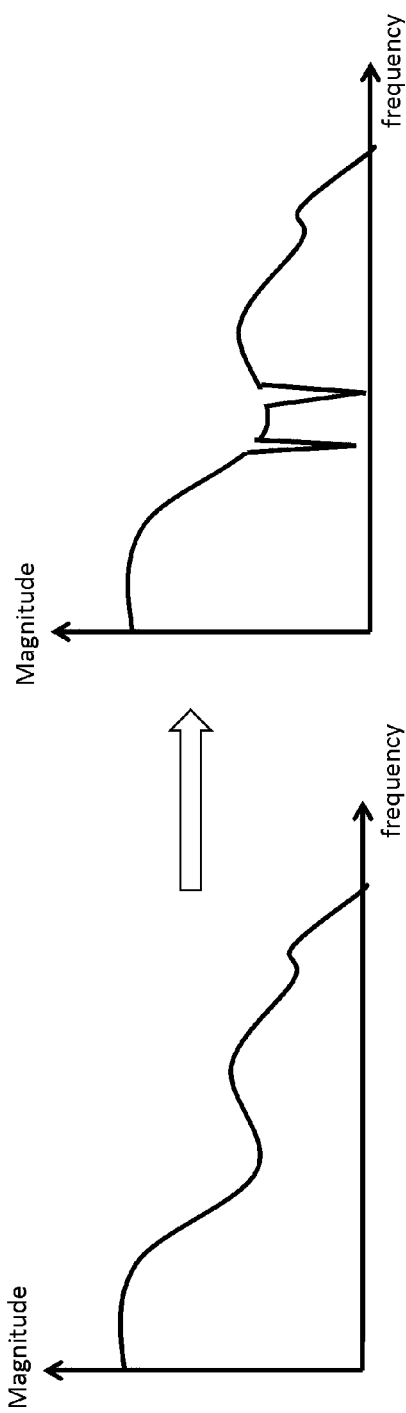
FIG. 4 illustrates an initial audio signal and a watermarked audio signal according to a first embodiment of the invention.

FIG. 4 illustrates on the left an initial audio signal and on the right the corresponding watermarked audio signal according to the first mode.

Figure 5:
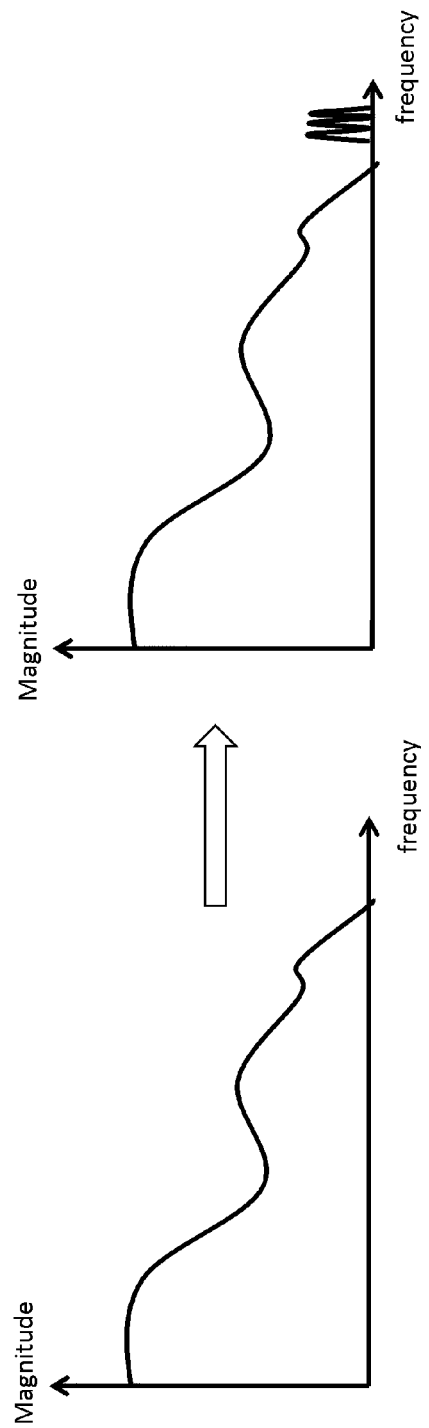
FIG. 5 illustrates an initial audio signal and a watermarked audio signal according to a second embodiment of the invention.

FIG. 5 illustrates on the left an initial audio signal and on the right the corresponding watermarked audio signal according to the second mode.

The candidates for the highest frequency depend on the whole audio path of the initial audio signal and depend mainly on four factors:
  The compression rate of the initial audio signal: for instance, an audio MP3 coded with a high compression rate will see all its frequency components removed over some threshold (for instance 16 kHz),
  The speakers quality of the local machine 2: the signal may be highly degraded over some frequency (harmonic discordance), the response over frequency is generally not flat over the audible bandwidth. As a consequence, the speaker quality may be very important when determining the highest frequency candidate. Obviously, since it is impossible to know in advance all the speakers used, some assumptions have to be done when choosing the frequency bands where to encode the watermarks,
  The microphone quality of the mobile communication device 1: just as the speaker quality, at the other end, the microphone quality is very important and may be a limiting factor
  The highest acceptable sample rate of the initial audio signal: after digitization, the sample rate is very important since the Nyquist frequency limits the highest frequency candidate.

After the choice of the frequency band, the watermark is implemented on the audio signal. The audio watermark is a pattern made in an initial audio signal by cutting (or removing) at least one frequency in a given frequency band or by amplifying the signal in at least one frequency in a given frequency band.

Obviously, if the local machine 2 is a dedicated device like a box placed in a shop, the audio path is only limited by the receiver.

The parameters to be sent to the mobile communication device 1 for each watermark i to be detected are, in addition to the event, at least:
  frequency bands in which the audio watermark has been made;
  a likelihood function $L_i$; and
  a likelihood threshold $T_i$.

The likelihood function $L_i$ may be set to output a value between 0 and 1, and the likelihood threshold $T_i$ may be set to 0.6. These parameters are used for determining with a probability of error considered as reasonably low that the acquired audio signal contains an audio watermark. To do that, we compute various power spectral densities in the frequency bands, then the likelihood function Li from these power spectral densities and we obtain an output from $L_i$ which is compared with the threshold $T_i$. If the output of the likelihood function $L_i$ exceeds the threshold $T_i$, we deduce (with a probability of error considered as reasonably low) that the acquired audio signal contains an audio watermark. In particular, the comparison permits to identify instantaneous spectral shape of the signal to a pattern. According to an embodiment, the likelihood function $L_i$ for a watermark i may be based on the computation of a mathematical distance between the normalized vector of the power spectral densities computed from the acquired signal and a vector of power spectral densities which is sent to the mobile communication device 1 along with the other parameters of the watermark i.

An example for the likelihood function $L_i$ for a watermark i, of this type, may be:

$$L_i = \frac{1}{\frac{1}{n}\sum_{k=2}^{n}\left(P_{ik} - P_{ik\_mes} \cdot \frac{P_{i0}}{P_{i0\_mes}}\right)^2}$$

where $P_{ik\_mes}$ is the power spectral density determined in the frequency band $F_{ik}$ of the acquired audio signal. In that case, in addition to the frequency bands $F_{ik}$ and the likelihood threshold $T_i$, the parameters for each watermark i comprises power spectral densities $P_{ik}$ for each frequency band $F_{ik}$ of the broadcasted watermarked audio signal.

According to alternative embodiment, after computation of the power spectral densities $P_{ik}$ in the frequency bands $F_{ik}$, the likelihood function $L_i$ may also be a succession of various operations, for instance:
  computation of various power spectral densities ratios $R_j$;
  comparison of each power spectral density ratio $R_j$ with various thresholds $T_j$;
  the result of this likelihood function $L_i$ being equal to 1 if all the power spectral density ratios $R_j$ are greater than the power thresholds $T_j$ and is equal to 0 if it is not the case;
  In this example, as the likelihood function outputs can only be 0 or 1, the threshold $T_i$ could be set equal to 0.5.

In that case, in addition to the frequency bands $F_{ik}$ and the likelihood threshold $T_i$, the likelihood function for each watermark i includes parameters such as the power thresholds $R_j$, the definition of the power spectral densities ratios $R_j$.

In order to prevent erroneous detection, a minimal threshold for the average power spectral densities of the acquired audio signal may be defined. If the average power spectral density is lower than the minimal threshold, the processing of the audio signal is cancelled.

As an example for a received audio signal in a frequency band between 3890 Hz and 4210 Hz, the minimal threshold could be set to 10 dB SWL.

The parameters of audio watermarks help the mobile communication device 1 to detect the audio watermark in the audio signal since it has to check the acquired audio signal only in the relevant part of the audio signal and has only to compute a simple function for detecting the audio watermark.

As a consequence, this method for watermark detection is more simple than the ones described in the state of the art publications and enables instantaneous detection. Indeed, there is no need to acquire the audio signal during a long period e.g. 10 to 30 seconds to be certain to detect the audio watermark. There is no need for complex steps of process to detect the audio watermark in the received signal. There is no need for connection to a server to retrieve the content corresponding to the detected watermark. Indeed, in the invention, once the event has been received, it may be triggered without connection to the remote server 3.

As already mentioned, according to the frequency of the audio signal to be watermarked, we consider two modes for encoding the watermark. In the following, we describe two examples of generation and we describe the corresponding detection based on the likelihood function of the alternative embodiment previously presented.

Encoding and Detecting the Audio Watermark in Frequency Between 4 to 10 kHz

These frequencies enable the selection of a frequency band where the audio signal is strong. In this frequency band the watermark will be encoded. As described above, in this frequency band, the audio watermark is a pattern made in the audio signal by attenuating (or cutting) (and possibly amplifying) various frequency bands.

Figure 6:
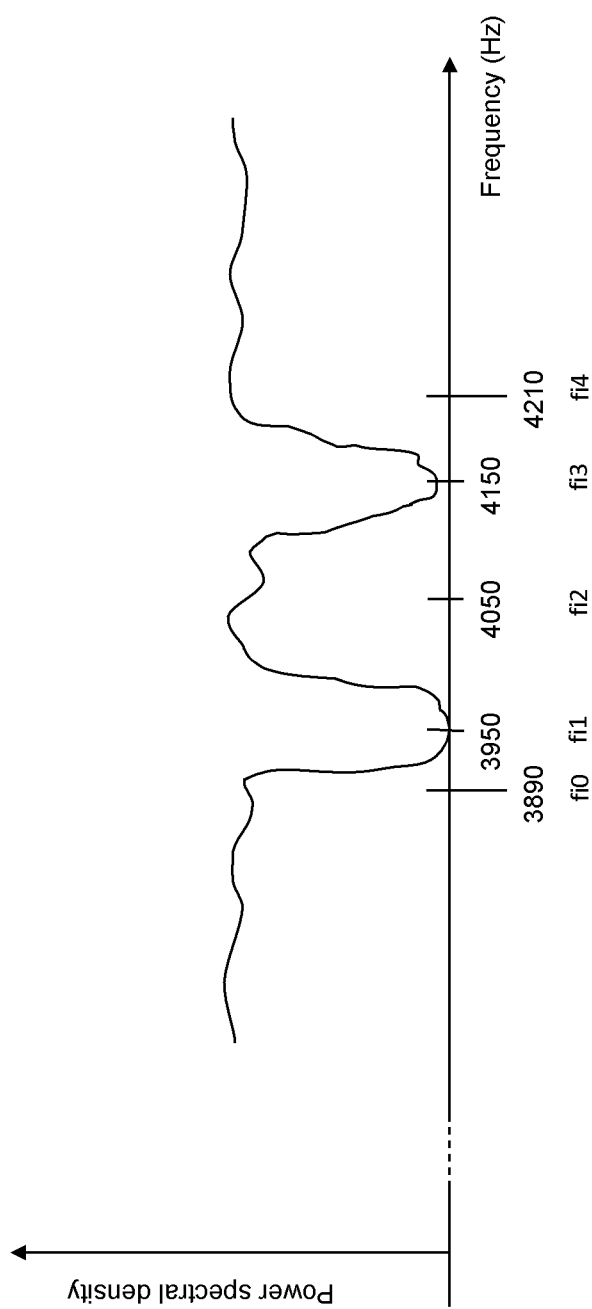
FIG. 6 illustrates the power spectral density of a watermarked audio signal in the low frequencies.

FIG. 6 illustrates an example of instant watermarking on the frequencies where the power spectral density is high. It represents the power spectral density of the watermarked signal over the frequency. The selection of the frequency band for which the power spectral density is high permits to improve the detection of the watermark in the audio signal. In the example of FIG. 6, the frequency band selected is between $f_{i0}=3890$ Hz and $f_{i4}=4210$ Hz. Once the frequency band is selected, the pattern is made in this frequency band in the initial audio signal. In particular, the pattern is made by cutting frequency bands. Therefore some frequencies in the most represented frequency band are masked. The masked frequencies are imperceptible by the user since they are in area wherein the audio signal is strong and since that their bandwidth are thin enough (maximum few hundreds of hertz). To this end, we select at least one frequency in the band and we attenuate the power of the signal in thin band around the selected frequency.

In the example of FIG. 6, three frequencies are selected: $f_{i1}=3950$ Hz, $f_{i2}=4050$ Hz, $f_{i3}=4150$ Hz and the power spectral density in band around $f_{i1}$ and $f_{i3}$ is set to zero. The cut bandwidth is between 50 to 200 Hz, preferably 100 Hz around each selected frequencies. The initial audio signal has been set to zero in the abovementioned frequencies. On the other hand, the power spectral density in frequencies around $f_{i0}$, $f_{i2}$ and $f_{i4}$ are equal to the ones of the initial signal. In that case, parameters sent to the mobile communication device 1 are:
- the five frequencies bands $F_{i0}$, $F_{i1}$, $F_{i2}$, $F_{i3}$, $F_{i4}$ around the five frequencies;
- a likelihood function $L_i$ which is defined by various ratios used for the detection (see below);
- a threshold $T_i$ for testing the likelihood function;
- events selected by the remote server 3 to correspond to the watermark i.

For detecting an audio watermark of this type, the mobile communication device 1 processes the acquired audio signal as described in the general method. The processing comprises the computation of the likelihood function $L_i$ comprising:
- The computation of five average power spectral densities $P_{i0}$, $P_{i1}$, $P_{i2}$, $P_{i3}$, $P_{i4}$ in bands $F_{i0}$, $F_{i1}$, $F_{i2}$, $F_{i3}$, $F_{i4}$;
- The computation of power ratios: $R1=P_{i0}/P_{i1}$, $R2=P_{i4}/P_{i3}$, $R3=P_{i2}/P_{i1}$, $R4=P_{i2}/P_{i3}$;
- The comparison of ratios R1 and R2 with a threshold critExt and ratios R3 and R4 with a threshold critIn.
- If the four ratios R1 to R4 exceed their corresponding thresholds the output of this likelihood function is 1. If not, the output is 0.

Then the result of the likelihood function is compared with the likelihood threshold $T_i$ (in that example $T_i=0.5$) corresponding to the audio watermark i and if it exceeds this threshold, the mobile communication device triggers the event $E_i$ corresponding to the detected audio watermark. Of course, the likelihood function and the rest of the detection process are computed if the power spectral densities are greater than the minimal threshold.

Encoding and Detecting the Audio Watermark in Frequency Between 15 to 16 kHz

Most of the audio signals transmit few energy in these high frequency bands. Contrary to the preceding case, the watermark is based on increasing the amplitude of some frequency bands of an initial audio signal. The amplification should concern frequencies over 10 kHz because the human auditory system (HAS) is less sensitive to the high frequency components of the audio signal (preferably over 15 kHz because the HAS is quasi insensitive to theses frequencies). The amplification is low and is based on a thin frequency band such that the audio signal is inaudible by the user. However, we do not amplify the initial audio signal over 16 kHz because, most local machine 2 does not broadcast audio signal over 16 kHz. But if possible, a dedicated local machine 2 (like a box installed in a shop) is used to broadcast frequencies at a higher frequency (preferably between 18 and 22 KHz). This local machine 2 may use dedicated hardware like a piezo electric buzzer for instance.

Figure 7:
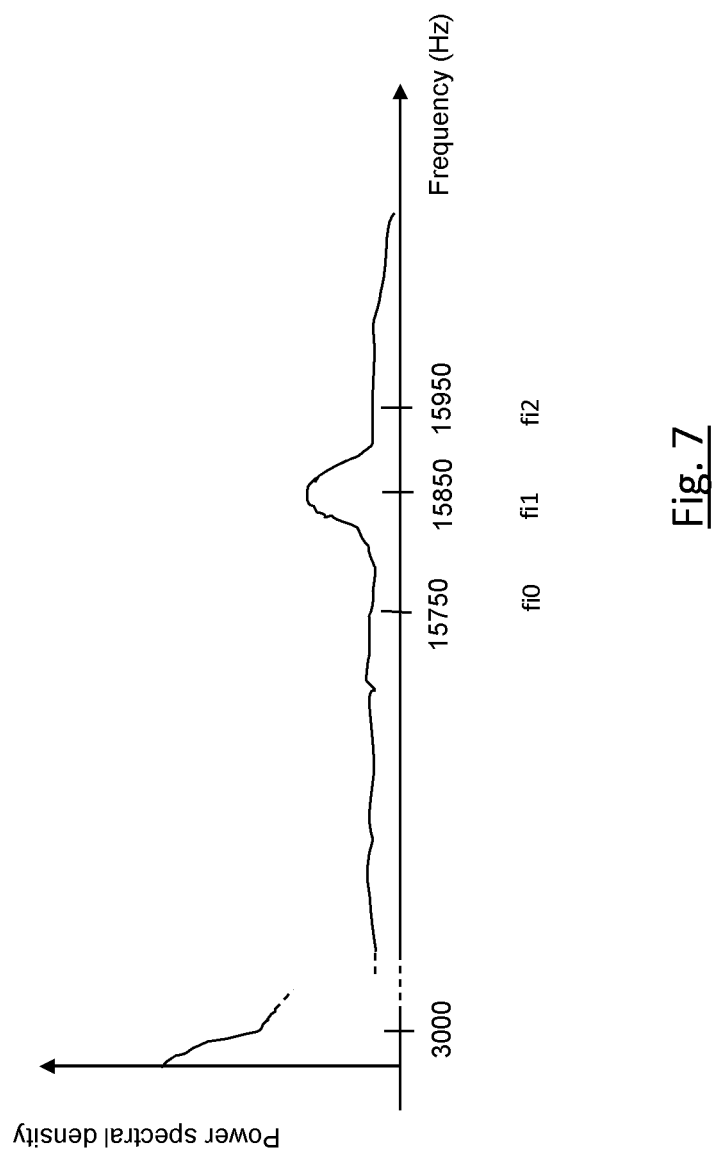
FIG. 7 illustrates the power spectral density of a watermarked audio signal in the high frequencies.

FIG. 7 illustrates the power spectral density of the watermarked audio signal using amplification. The frequency band selected is between $f_{i0}=15750$ Hz and $f_{i2}=15950$ Hz. Contrary to the preceding case, there is no need to select a band in the most represented frequencies. As shown on this figure, the audio signal is amplified in a band around $f_{i1}=15850$. The amplified bandwidth is between 50 to 200 Hz, preferably 100 Hz. To detect this type of audio watermark the mobile communication device 1 processes the acquired audio signal. The detection of an audio watermark in these frequencies is similar to the other case. In this example, the likelihood function $L_i$ comprises the computation of power ratios $R1=P_{i1}/P_{i0}$, $R2=P_{i1}/P_{i2}$ and the comparison of each power ratio with various thresholds defined when the pattern is made in the initial audio signal. Thus the likelihood function $L_i$ comprises the comparison of ratios R1 and R2 with the same threshold critIn. The result of the likelihood function is the information according to whether or not the two ratios exceed the above threshold. If the two ratios exceed the above threshold, the mobile communication device 1 triggers the event corresponding to the detected watermark.

Watermarking Methods

In order to generate the watermark, we consider two generation modes:
- The whole initial audio signal is scanned and the watermark is added in finding the best configuration. For instance, the frequency band is chosen as the one with a high power spectral density and a low variance over time. Then, a new media file is generated and for instance broadcasted on television.

The audio signal is watermarked "on the fly". In that case, we do not have the possibility to choose the best frequency slot since the signal has to be watermarked in real time. The local machine considered in that case is a MP3 player, a computer, a Hi-Fi equipment, etc., with speakers.

Methods for Watermarking "on the Fly"

Two methods are considered for watermarking "on the fly". The first method is to watermark the initial audio signal "on the fly" in the numeric stream. The watermarking is achieved just as a digitalized equalizer. At the operating system level, just before the audio output of the local machine 2, some components are added or removed from the audio stream. Or else, a specific software is used to produce the watermark. Or else, a plugin (for instance a web browser plugin) is provided to produce the watermarked audio signal. Since the watermark may be produced by adding some frequency pattern, producing this signal is not necessarily linked to a particular media source file, and can work with any kind of audio signal (or even silence). In an embodiment, the watermarked audio signal is broadcasted from the remote server 3. The local machine 2 is then downloading this watermarked audio signal using a Web Browser or a specific software (audio player plugged to an IP audio stream) and broadcasting the watermarked audio signal using the speakers.

The second method is watermarking the signal "on the fly" using a specific electronic device. The goal of this device is to work on the analog initial audio signal. In each case, the device is short-circuiting the initial audio signal between the audio out of the audio device (computer by instance) and the speakers.

Under a particular implementation using a computer, this device is a USB device. The USB connector is used to supply the device and to send the information to watermark. The device has two connector jacks. The first one is used to connect to the audio out of the computer. The second one is used to connect to the speakers.

Figure 8A:
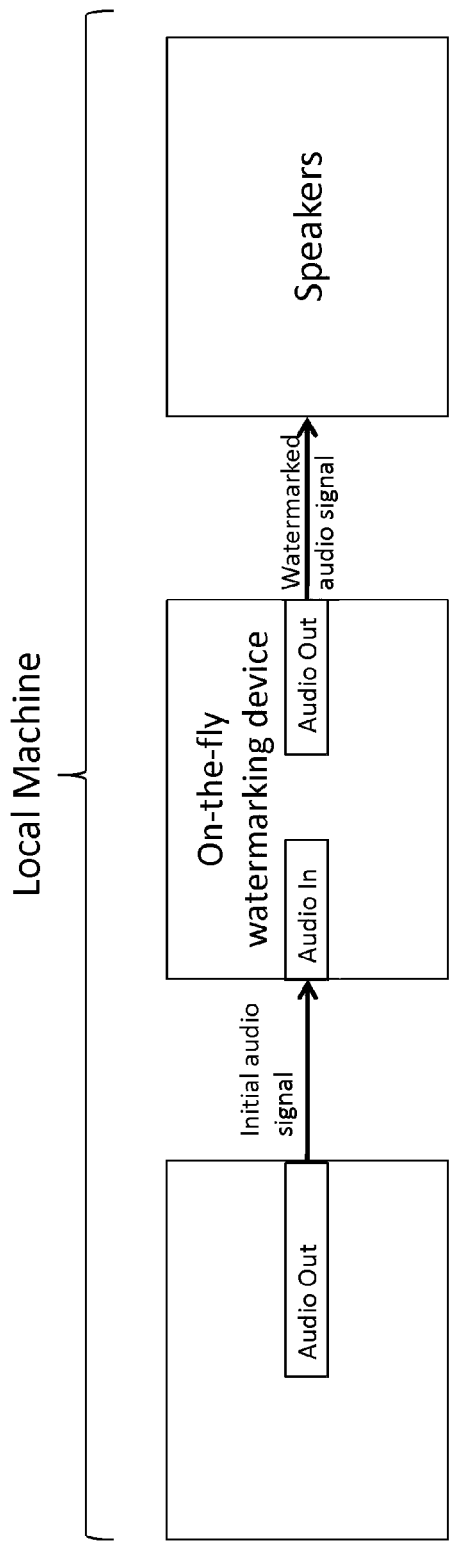
FIGS. 8a and 8b illustrate two configurations of a device for watermarking "on the fly" an initial audio signal.
Figure 8B:
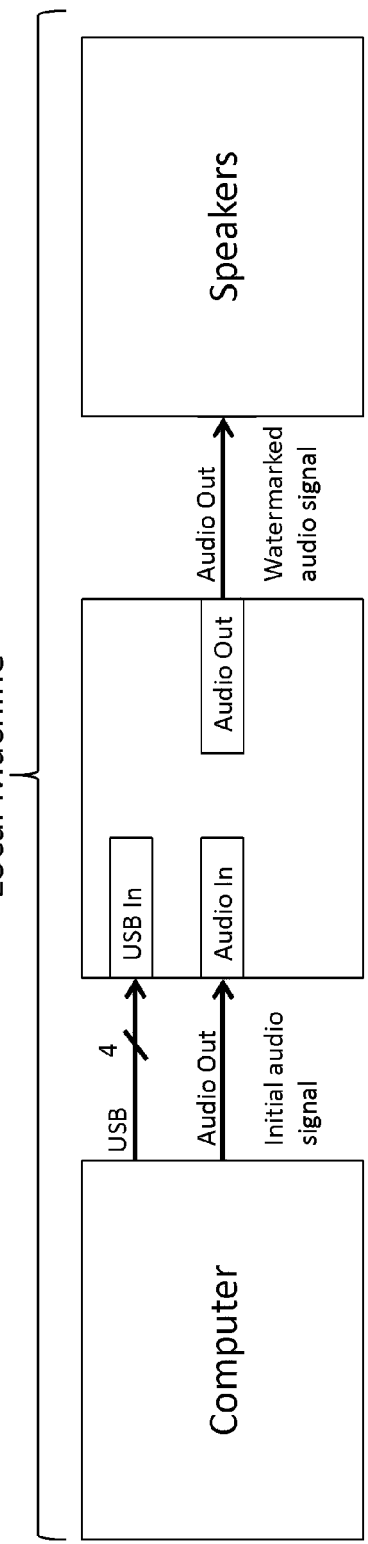

FIGS. 8a and 8b illustrate two possible implementations of this device.

On FIG. 8a, this device is short-circuiting the initial audio signal to mix it with another signal non audible by the human but that the software in the mobile communication 1 device can identify. For instance, an ultrasound between 18.5 kHz and 22 kHz may be mixed with the initial signal to produce a new audio signal to be broadcasted. In that case, the electronic function only consists in generating one or several carriers in the ultrasound domain, then mixing the generated signal with the output signal of the computer/audio player/etc.

On FIG. 8b, this device is short-circuiting the initial audio signal to modify it dynamically in such a way that a human can't see the difference contrary to the specific receiver, for instance in removing some very narrow frequency bands. In that case, the electronic function is more complicated because the signal needs to be processed. Contrary to the previous configuration of FIG. 8a, a circuitry dedicated to signal processing and DSP may need to be embedded. For instance, the signal may have to be decomposed in the frequency domain using for instance a FFT, then, some of the frequency bands has to be enhanced, removed or lowered, and then the signal needs to be reconstructed using by instance a reverse FFT.

While the above embodiments have been described with reference to the accompanying drawings, it is to be understood that the present disclosure is not limited to the disclosed embodiments, but, on the contrary, is intended to cover various modifications and equivalent arrangements included within the spirit and scope of the appended claims.

What is claimed is:

1. A method of delivering content to at least one mobile communication device in a computing environment comprising software for detecting audio watermark in a watermarked audio signal broadcasted by at least one local audio transmitter and if necessary triggering an event on the mobile communication device, the method comprising:
the mobile communication device periodically determining a user local profile, the local profile comprising a localization of the mobile communication device;
the mobile communication device periodically sending, to a remote server, a request for parameters of at least one audio watermark i, the parameters comprising N frequency bands $F_{ik}$, k=0, ..., N−1, a likelihood function $L_i$ to be computed, a likelihood threshold $T_i$ and at least one event to be triggered on the mobile communication device corresponding to the audio watermark along with the user local profile;
the mobile communications device receiving the parameters from the remote server, if necessary, the parameters having been selected by the remote server in view of the user local profile so that the event is relevant for the user;
the mobile communication device storing in its memory the parameters;
the mobile communication device polling its environment for acquiring an audio signal and processing the audio signal in:
determining the power spectral density of the audio signal for each of the frequency bands;
computing the likelihood function corresponding to each watermark to be studied;
if the result of the likelihood function exceeds the likelihood threshold, triggering the corresponding event on the mobile communication device.

2. The method according to claim 1, wherein the parameters of the watermark i further comprise power spectral densities $P_{ik}$ for each of frequency band $F_{ik}$ of the broadcasted watermarked audio signal, and wherein the likelihood function $L_i$ for a watermark i is based on the computation of a mathematical distance between the normalized vector of the power spectral densities computed from the acquired signal and the vector of the power spectral densities sent to the mobile communication device along with the other parameters of the watermark i.

3. The method according to claim 1, wherein the parameters of the watermark i further comprise power spectral densities $P_{ik}$ for each of frequency band $F_{ik}$ of the broadcasted watermarked audio signal, and wherein the likelihood function $L_i$ for a watermark i being based on calculating the ratios between at least two power spectral densities of the acquired signal.

4. The method according to claim 1, wherein the remote server compares the previous transmitted parameters with the ones that the remote server is ready to transmit back to the mobile communication device and only transmits back to the mobile communication device if they are different.

5. The method according to claim 1, wherein the polling comprises an acquisition time and a wait time, the ratio between the busy acquisition time and wait time being greater than 10.

6. The method according to claim 1, wherein the mobile communication device acquires the audio signal about every 2 to 10 seconds.

7. The method according to claim 1, wherein the mobile communication device acquires the audio signal about during 50 to 300 ms.

8. The method according to claim 1, wherein the watermark of the audio signal is a pattern made in a frequency band of an initial audio signal by modifying the amplitude of an initial audio signal in this frequency band, the parameters for the detection being relevant frequency bands describing the variations of the pattern and threshold for identifying the variations.

9. The method according to claim 1, wherein the pattern is made by attenuating at least one frequency of the initial audio signal in the frequency band.

10. The method according to claim 8, wherein the pattern is obtained by amplifying the audio signal in at least one frequency band of the initial audio signal.

11. The method for delivering content according to claim 1, wherein the local machine comprises a module for generating the watermarked audio signal from an initial audio signal and then broadcasting the watermarked audio signal.

12. The method for delivering messages according to claim 1, wherein the server determines a user remote profile, the user remote profile comprising at least: interest of the user, gender of the user, and in addition to the user local profile, the server selects the parameters and the event depending on this remote profile.

13. The method for delivering messages according to claim 1, wherein the mobile communication device sends the user local profile to the remote server periodically, and preferably every ten minutes.

14. A system for delivering content to a mobile communication device comprising software for detecting audio watermark in a watermarked audio signal broadcasted by a local machine and if necessary triggering an event on the mobile communication device, the system being adapted for delivering content according to claim 10.

15. A system for delivering content to a mobile communication device comprising software for detecting audio watermark in a watermarked audio signal broadcasted by a local machine and if necessary triggering an event on the mobile communication device, the system having software, that when executed by a computing environment, being adapted to comprise:
  the mobile communication device periodically determining a user local profile, the local profile comprising a localization of the mobile communication device;
  the mobile communication device periodically sending, to a remote server, a request for parameters of at least one audio watermark i, the parameters comprising N frequency bands $F_{ik}$, $k=0,\ldots,N-1$, a likelihood function $L_i$ to be computed, a likelihood threshold $T_i$ and at least one event to be triggered on the mobile communication device corresponding to the audio watermark along with the user local profile;
  the mobile communications device receiving the parameters from the remote server, if necessary, the parameters having been selected by the remote server in view of the user local profile so that the event is relevant for the user;
  the mobile communication device storing in its memory the parameters;
  the mobile communication device polling its environment for acquiring an audio signal and processing the audio signal in:
    determining the power spectral density of the audio signal for each of the frequency bands;
    computing the likelihood function corresponding to each watermark to be studied;
    if the result of the likelihood function exceeds the likelihood threshold, triggering the corresponding event on the mobile communication device.

\* \* \* \* \*

UNITED STATES PATENT AND TRADEMARK OFFICE
CERTIFICATE OF CORRECTION

PATENT NO.       : 9,065,578 B2  
APPLICATION NO.  : 13/720070  
DATED            : June 23, 2015  
INVENTOR(S)      : Perret et al.

Page 1 of 1

It is certified that error appears in the above-identified patent and that said Letters Patent is hereby corrected as shown below:

In the Specification

In column 8 at line 62, Change "$R_j$," to --$T_j$,--.

Signed and Sealed this
Twenty-sixth Day of April, 2016

Michelle K. Lee  
*Director of the United States Patent and Trademark Office*